United States Patent [19]

Spear

[11] Patent Number: 4,811,380

[45] Date of Patent: Mar. 7, 1989

[54] CELLULAR RADIOTELEPHONE SYSTEM WITH DROPPED CALL PROTECTION

[75] Inventor: Stephen L. Spear, Skokie, Ill.

[73] Assignee: Motorola, Inc., Schaumburg, Ill.

[21] Appl. No.: 150,253

[22] Filed: Jan. 29, 1988

[51] Int. Cl.$^4$ .............................................. H01Q 7/00
[52] U.S. Cl. ...................................... 379/60; 379/63; 433/33
[58] Field of Search .................. 379/63, 60, 58, 59, 379/61, 62; 340/825.44, 311.1, 313, 825.54; 455/33, 34, 12, 54, 52

[56] References Cited

U.S. PATENT DOCUMENTS

| | | | |
|---|---|---|---|
| 3,663,762 | 5/1972 | Joel, Jr. ............................ | 179/41 A |
| 3,898,390 | 8/1975 | Wells et al. ...................... | 179/41 A |
| 3,906,166 | 9/1975 | Cooper et al. .................... | 179/41 A |
| 4,028,500 | 6/1977 | McClure et al. .................. | 179/41 A |
| 4,268,722 | 5/1981 | Little et al. ...................... | 179/2 EB |
| 4,352,183 | 9/1982 | Davis et al. ...................... | 455/54 |
| 4,395,594 | 7/1983 | Meyerle ............................ | 379/63 |
| 4,398,063 | 8/1983 | Hass .................................. | 179/2 EB |
| 4,430,755 | 2/1984 | Nadir et al. ...................... | 455/77 |
| 4,475,010 | 10/1984 | Huensch et al. ................. | 179/2 EB |
| 4,485,486 | 11/1984 | Webb et al. ...................... | 455/33 |
| 4,549,311 | 10/1985 | McLaughlin ...................... | 455/277 |
| 4,556,760 | 12/1985 | Goldman .......................... | 179/2 EB |
| 4,573,209 | 2/1986 | Deman et al. .................... | 455/73 |
| 4,596,042 | 6/1986 | Stangl ............................... | 455/56 |
| 4,608,711 | 8/1986 | Goldman .......................... | 455/33 |
| 4,633,509 | 12/1986 | Scheinert ......................... | 455/33 |
| 4,654,867 | 3/1987 | Labedz et al. .................... | 379/59 |
| 4,677,687 | 6/1987 | Matsuo ............................. | 455/10 |
| 4,682,367 | 7/1987 | Childress et al. ................ | 455/17 |
| 4,694,484 | 9/1987 | Atkinson et al. ................. | 379/59 |
| 4,696,027 | 9/1987 | Bonta ................................ | 379/60 |
| 4,742,560 | 5/1988 | Arai .................................. | 455/33 |
| 4,748,655 | 5/1988 | Thrower et al. .................. | 379/60 |

FOREIGN PATENT DOCUMENTS

| | | | |
|---|---|---|---|
| 0164336 | 9/1983 | Japan ................................ | 379/60 |
| 0186239 | 10/1983 | Japan ................................ | 379/60 |
| 0058928 | 4/1984 | Japan ................................ | 379/60 |
| 0157125 | 7/1986 | Japan ................................ | 379/60 |
| 0251241 | 11/1986 | Japan ................................ | 379/60 |

OTHER PUBLICATIONS

"Advanced 800 MHz Trunked Radio Systems", Motorola, Inc. Publication No. RO-6-07.
"Primer of the Future . . . Digital Technology", L. M. Ericsson Company.

Primary Examiner—Robert Lev
Attorney, Agent, or Firm—Robert J. Crawford

[57] ABSTRACT

An improved cellular telephone communication system is described having operational steps which prevent a call from being dropped due to a radiotelephone not receiving a handoff instruction from its host base site. The system includes a switch controller for determining that the radiotelephone requires a handoff from a first base site coverage area to a second base site coverage area and for communicating a handoff message to the associated first and second base site equipment. The first base site equipment then transmits the handoff message to the radiotelephone. If the radiotelephone does not receive the message, it determines that the call has been lost, siezes a signalling channel from the second base site, and requests, via the second base site a call reconnection by transmitting a special message. The second base site then informs the radiotelephone of the handoff instruction and the handoff is completed with a successful reconnection of the call.

32 Claims, 7 Drawing Sheets

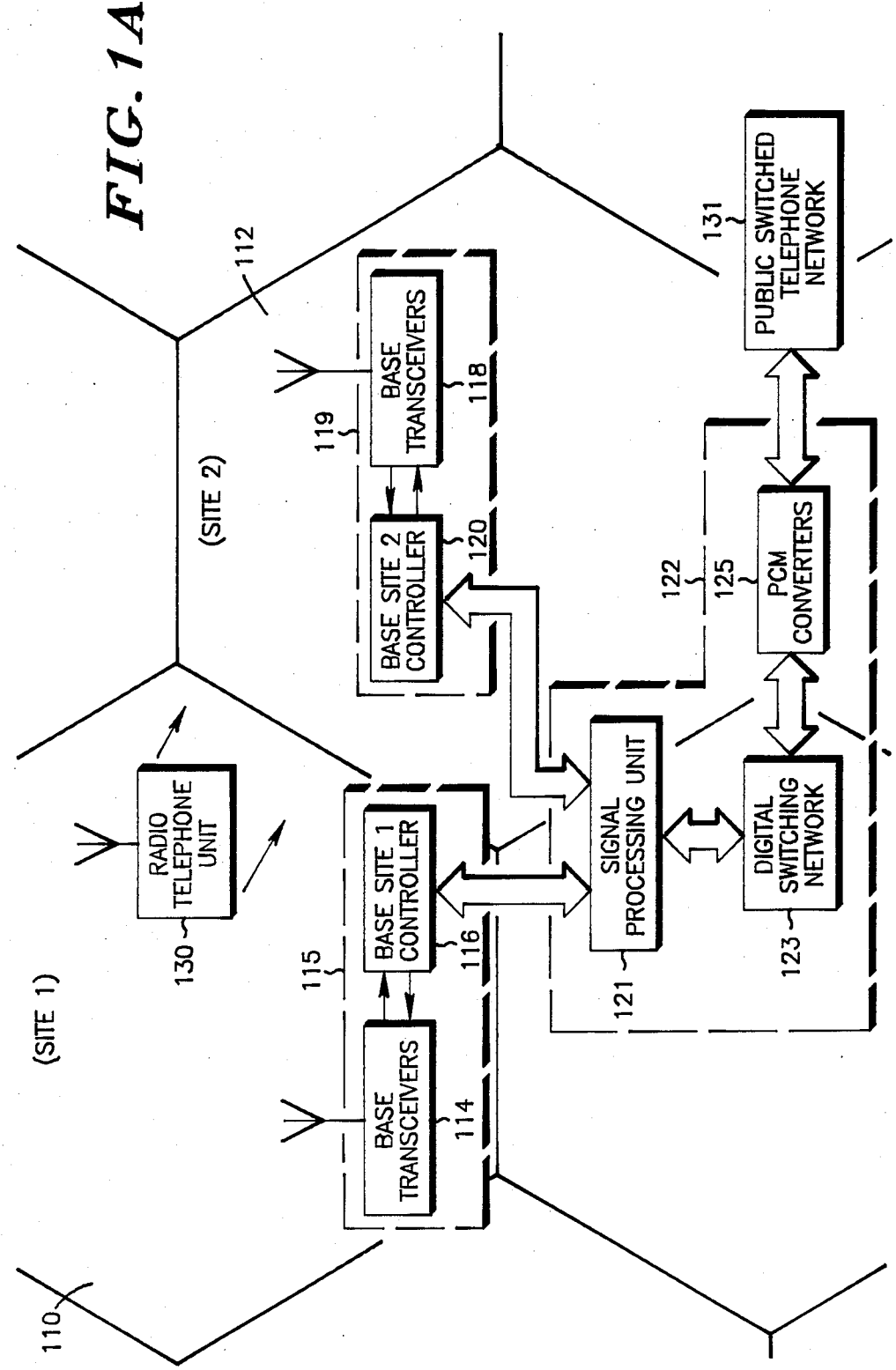

BASE SITE EQUIPMENT

SITE 1

RADIO TELEPHONE UNIT

CELLULAR RADIOTELEPHONE SYSTEM WITH DROPPED CALL PROTECTION

FIELD OF THE INVENTION

The present invention relates generally to radio communication systems, and, more particularly, to cellular communication systems and the prevention of a dropped call therein during a "handoff", i.e., the process of transferring a radiotelephone call from a voice channel within one coverage area to a voice channel within an adjacent coverage area.

BACKGROUND

Many mobile communication systems employ multiple coverage areas to accommodate necessary mobile communication over a defined region. Of such systems, simulcast communication systems and cellular communication systems are the most common types which provide handoffs between coverage areas. In simulcast communication systems, a relatively simple handoff technique is used. Simulcast communication systems involve linking together the respective coverage areas of a plurality of communication sites to form a large wide area coverage area. The system typically employs communication channels which are common to each individual coverage area. As a mobile radio exits the coverage area of one site and enters the coverage area of another site, a conversation on the mobile radio is maintained because the linking of the multiple sites allows for simultaneous reception and broadcasting of the conversation at each site on the same channel.

Unlike simulcast communication systems, cellular communication systems do not employ common communication channels between the various sites. Rather, each coverage area employs a base site which includes a number of base stations for providing radiotelephones within the base site coverage area with a number of radiotelephone communication channels which are unique with respect to adjacent base site coverage areas. Each base site is controlled by the system's central switch controller.

A handoff between two base sites in a cellular communication system is primarily accomplished through communication between the radiotelephone and the radio equipment at the base site from which the radiotelephone is exiting. The base site equipment periodically measures the signal strength of the radiotelephone during the conversation, and, once it reaches a relatively low signal strength threshold, the same base site equipment sends a message to the adjacent base sites to determine which base site the radiotelephone is entering. The radiotelephone is then instructed to communicate on a selected channel from the base site equipment associated with the coverage area the radiotelephone is entering. Unfortunately, if the radiotelephone has already exited the coverage area of the base site sending the message or if the radiotelephone's reception of the message is momentarily inhibited by interference during the coverage area exit, the handoff will be unsuccessful, i.e., the conversation (call) will be dropped.

The frequency of this problem can be limited somewhat by increasing the overlap of the adjacent base site coverage areas. However, this reduces the overall coverage region of the system which can be compensated only by increasing the number of base sites and the cost.

Accordingly, a system for providing a handoff between coverage areas is needed which overcomes the aforementioned deficiencies.

OBJECTS OF THE PRESENT INVENTION

It is a general object of the present invention to provide a cellular communication system which overcomes the foregoing shortcomings.

It is a more particular object of the present invention to provide a cellular communication system which ensures that a radiotelephone handoff will be successful if the radiotelephone does not receive the original handoff information.

Additional objects of the present invention include providing an improved radiotelephone, an improved base site and an improved switch controller which operate in accordance with the cellular communication system of the present invention.

BRIEF DESCRIPTION OF THE DRAWINGS

The features of the present invention which are believed to be novel are set forth with particularity in the appended claims. The invention, together with further objects and advantages thereof, may best be understood by making reference to the following description taken together with the accompanying drawings, in which reference numerals identify the elements, and wherein:

FIG. 1a is a diagram of a cellular system including two base sites and their respective equipment, according to the present invention;

DETAILED DESCRIPTION OF THE PREFERRED EMBODIMENT

Figure 1B:
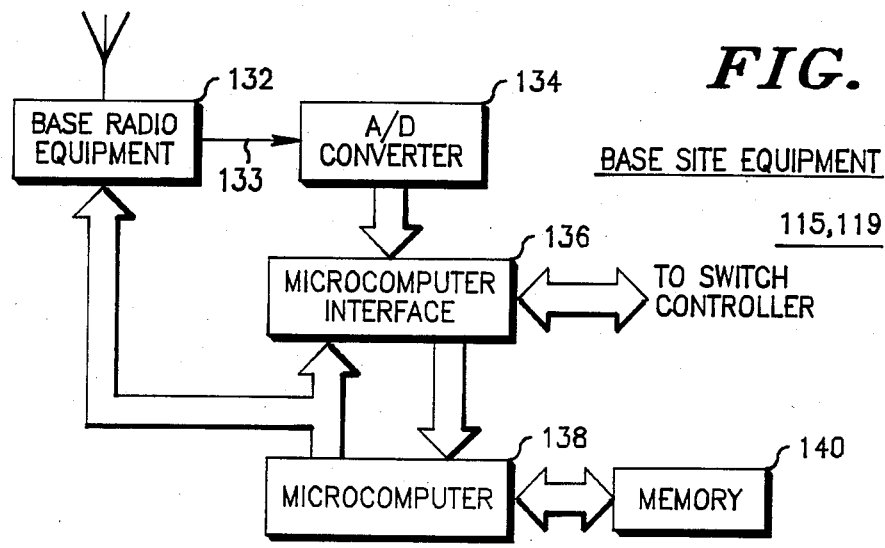
FIG. 1b is an expanded diagram of the base site equipment 115 or 119 of FIG. 1a, according to the present invention.

The arrangement disclosed in this specification has particular use for handing-off radiotelephone units between cells in a cellular telephone infrastructure. More particularly, the arrangement disclosed herein is directed to ensuring that an attempted handoff of a radiotelephone unit in such an infrastructure is successful.

FIG. 1a illustrates a unique cellular system which, in simplified form, includes base site equipment 115 and 119 for two geographic radio frequency (RF) coverage areas (cells) 110 and 112, respectively. For cell 110, the base site equipment 115 includes a set of base transceivers 114 and a base site (1) controller 116. For cell 112, the base site equipment 119 includes a set of base transceivers 118 and a base site (2) controller 120 with substantially identical circuitry as the base site equipment 115.

For purposes of exemplifying the handoff operation of the present invention, an improved radiotelephone unit 130 is depicted in transition from cell 110 to cell 112.

Overall control of the base site equipment 115 an 119 is provided by a signal processing unit 121 of a cellular switch controller 122. The switch controller 122 also includes a digital switching network 123 for controlling the call switching operation between a public switched telephone network (PSTN) 131 and the base site equipment 115 and 119. A set of pulse code modulation (PCM) converters 125 are included in the cellular switch controller 122 as an interface to the PSTN 131.

In FIG. 1b, the base site equipment 115 or 119 is shown in expanded form. It includes conventional base radio equipment 132 for communicating with radiotelephones within its associated coverage area. The voice paths between the switch controller 122 (FIG. 1) and the base radio equipment 115 or 119 are not shown.

The intelligence control of the base site equipment is provided by a microcomputer 138. The microcomputer 138 is used to control the radio equipment 132 and to interface the base site equipment with the signal processing equipment 121 of the switch controller 122 (FIG. 1a). An analog to digital converter (ADC) circuit 134 is used for receiving an output signal 133 from a scanning receiver (not shown) within the base radio equipment 132. The output signal of the scanning receiver contains signals received from the radiotelephones, and, after being converted by the ADC circuit 134, such signals are analyzed by the microcomputer 138. A microcomputer interface circuit 138 is used to interface the ADC circuit 134 and the switch controller 122 with the microcomputer 138.

Figure 1C:
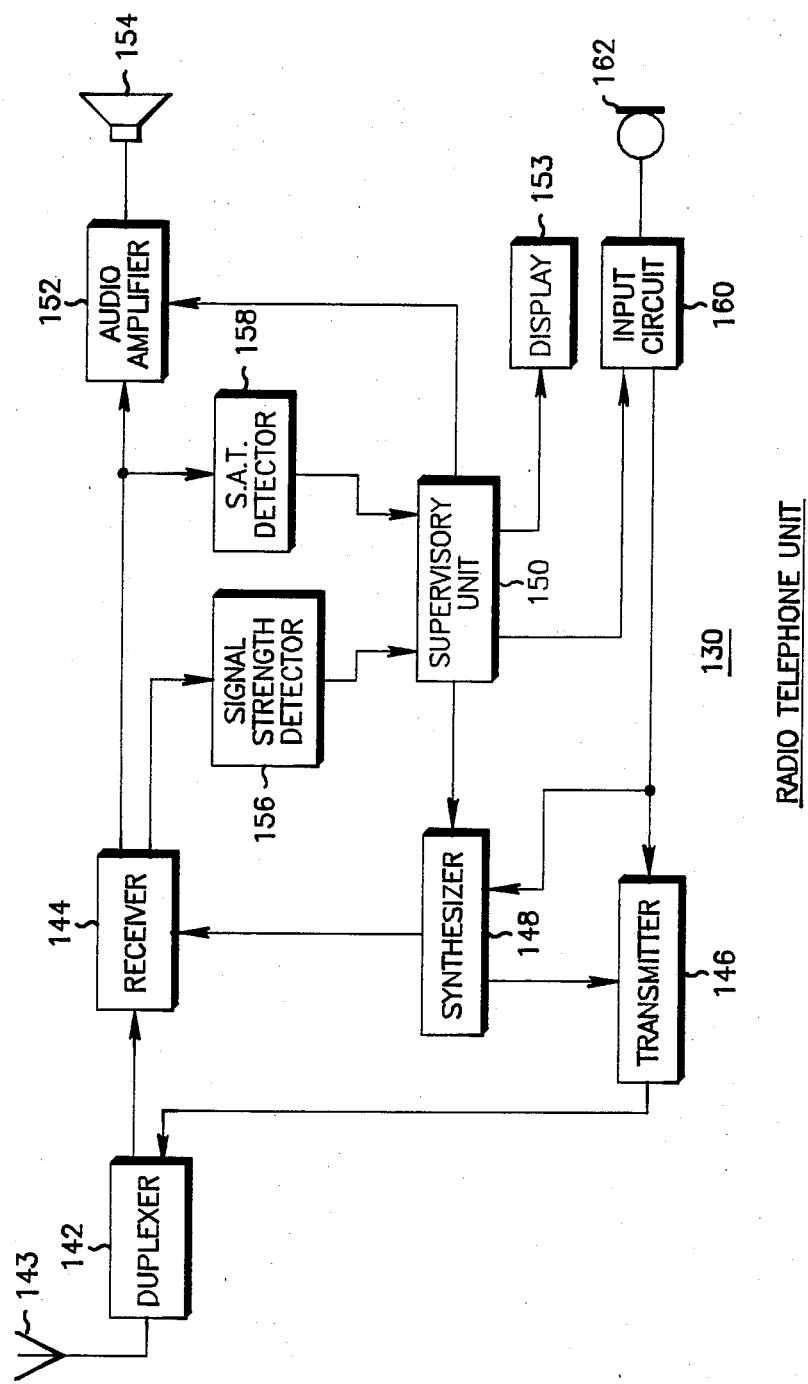
FIG. 1c is an expanded diagram of the radiotelephone unit 130 of FIG. 1a, according to the present invention.

In FIG. 1c, the radiotelephone unit 130 of FIG. 1a is illustrated in expanded form. It includes a conventional duplexer 142 for interfacing a receiver 144 and a transmitter 146 with an antenna 143. A synthesizer is used for providing a stable, yet programmable oscillator signal to the transmitter 146 and to the receiver 144. The intelligence control of the unit 130 is provided by a supervisory unit 150 which includes a microcomputer (not shown).

The supervisory unit 150 is used to select the frequency channels in the synthesizer at which the unit 130 will be operating and to control miscellaneous subscriber interface circuits including: an audio amplifier 152 and a speaker 154 coupled thereto; a display circuit 153 for displaying messages to the subscriber; and a microphone 162 and an input circuit 160 which includes a keypad (not shown). Additionally, coupled to the receiver 144 are a signal strength detector 156 and a supervisory audio tone (SAT) detector 158 for indicating to the supervisory unit the power level of the received signal and whether or not SAT is being received, respectively.

Every block shown in FIGS. 1a, 1b and 1c represent conventional equipment operating in a conventional system except for the operational modifications described herewith. For general details of such a conventional system, reference may be made to "Cellular Voice and Data Radiotelephone System", Labedz et. al., U.S. Pat. No. 4,654,867, assigned to the same assignee, may be modified in accordance herewith. For further details of a conventional cellular switch controller, reference may be made to U.S. Pat. No. 4, 268,722, Little et al., assigned to the same assignee. For further details of conventional base site equipment, reference may be made to U.S. Pat. No. 4,485,486, assigned to the same assignee. For further details of a radiotelephone unit, reference may be made to U.S. Pat. No. 3,906,166, Little et al., assigned to the same assignee, and to "DYNATAC Cellular Mobile Telephone Instruction Manual", Motorola Publication No. 68P81070E40, available from Motorola C & E Parts, 1313 E. Algonquin Rd., Schaumburg, Ill., 60196. For details of a signal strength detector and a SAT detector (from the radiotelephone unit 130), reference may be made to U.S. Pat. Nos. 4,549,311 (assigned to the same assignee) and 4,025,853, respectively. The foregoing references and patents are incorporated herein by reference.

Before a complete description of the present invention is presented, using the flowcharts in FIGS. 2 and 3, a description of a conventional handoff operation is provided below.

Figure 2:
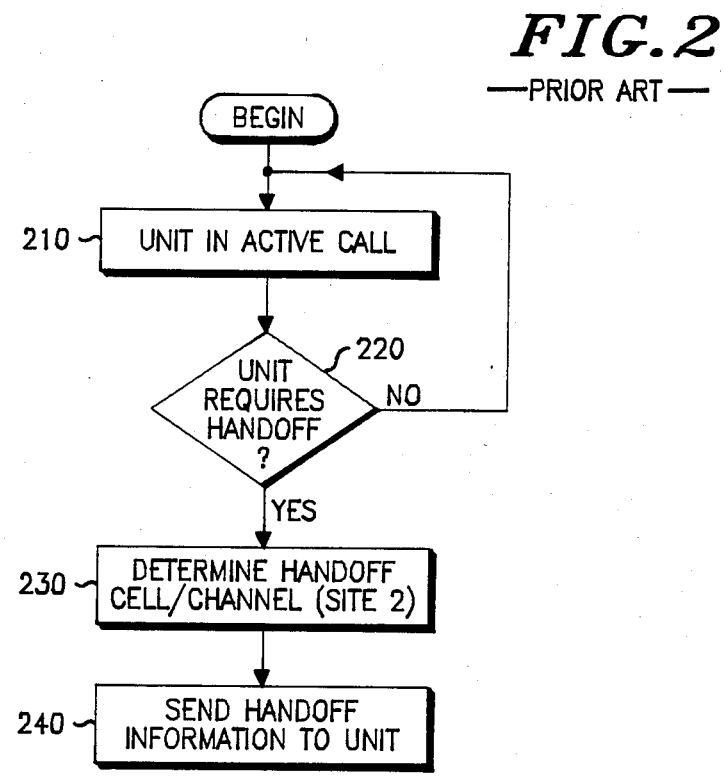
FIG. 2 is a flowchart illustrating the conventional handoff operation of a base site controller for a radiotelephone exiting the associated coverage area, which conventional handoff operation may be used in a cellular system to implement the present invention.

Referring to FIG. 2, a conventional handoff technique for a conventional radiotelephone exiting cell 110 (FIG. 1a), as executed by conventional base equipment, is illustrated in flowchart form. The flowchart begins at block 210 where the radiotelephone unit is presumed in an active call (radiotelephone conversation in progress). At block 220 the base equipment determines if the unit should be handed-off to an adjacent cell (for example, from cell 110 to cell 112). The determination of whether or not a handoff is necessary can be performed using a number of different techniques such as the technique described in U.S. Pat. No. 4,696,027, by Jeffrey D. Bonta, assigned to the same assignee and incorporated herein by reference. If a handoff is not necessary, flow returns to block 210.

If a handoff is necessary, flow proceeds from block 220 to block 230 where the cell and channel of the site to which the unit is to be handed-off is selected using conventional techniques. Typically, such a selection is accomplished by the host base site equipment (site 1 of FIG. 1a) indicating to the switch controller that it has a handoff candidate. The switch controller then sends a message to the base site equipment of adjacent base sites to measure and report the strength of the received signal from that radio telephone unit. The adjacent base site equipment reporting the greatest received signal strength is then selected as the target base site (site 2 of FIG. 1a) and an available channel from the associated channel allocation for that site is chosen for the radio telephone unit to implement the handoff.

The selected information which includes the target handoff cell and channel is then transmitted from the host base site (site 1 of FIG. 1a) to the radiotelephone unit so that the unit may reconfigure its transceiver to commence communication within its new coverage area (cell 112), depicted at block 240.

Figure 3:
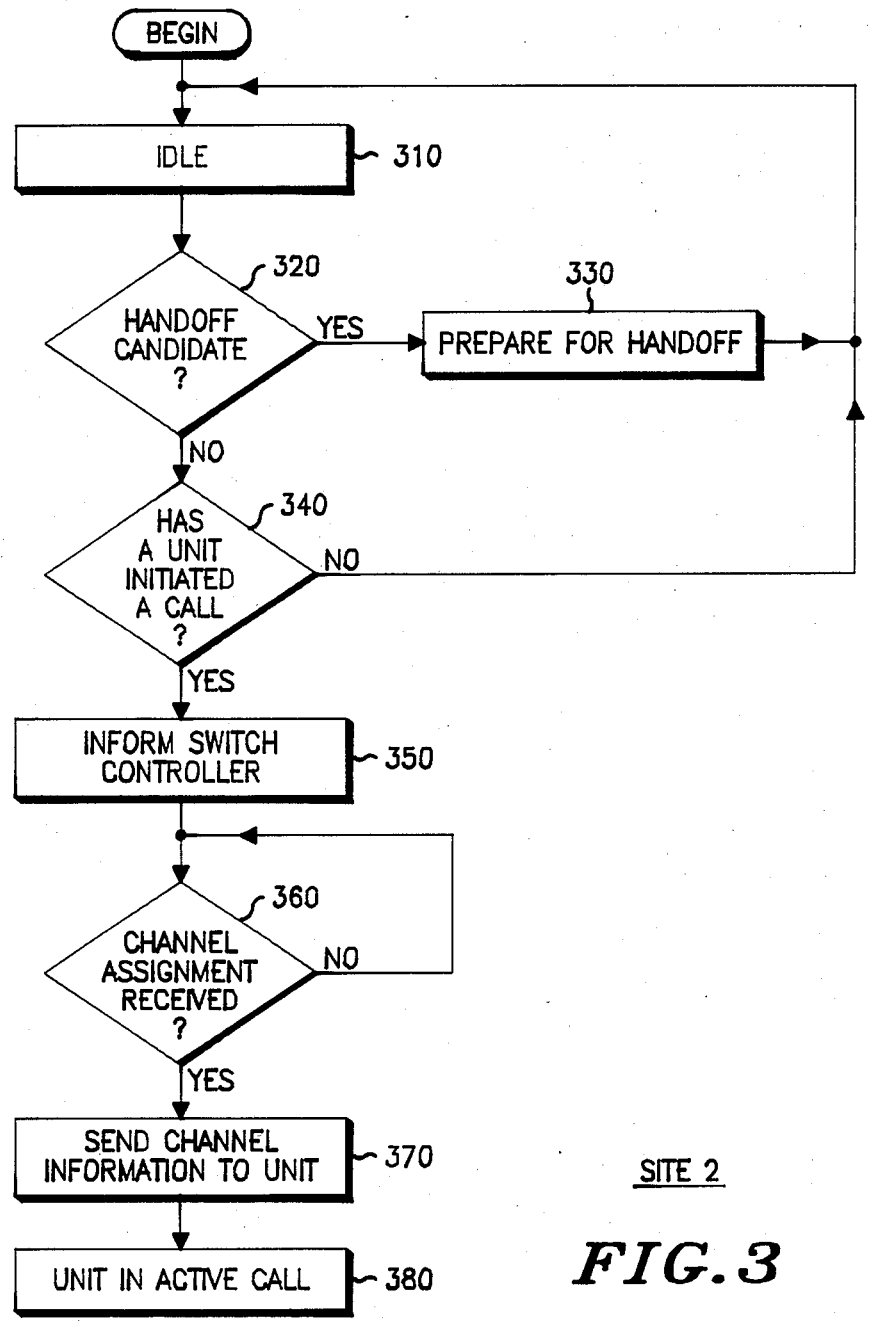
FIG. 3 is a flowchart illustrating the conventional handoff operation of a base site controller for a radiotelephone entering the associated coverage area, which conventional handoff operation may be used in a cellular system to implement the present invention.

In FIG. 3, the corresponding conventional handoff operation of the target handoff base site equipment (site 2 of FIG. 1a) is illustrated in flowchart form. The flowchart begins at block 310 with the base site equipment idle (executing background tasks). At block 320 a test is performed to determine if information has been received from the system's switch controller (analogous to the central switch controller 122 of FIG. 1a) indicating that a radiotelephone unit is about to be handed-off. If a radiotelephone unit is about to be handed-off to a particular base site, an available channel from that base site equipment is selected. The base site equipment then monitors the channel to determine if the handoff is successful, depicted at block 330. Such conventional operation is described and illustrated in detail in U.S. Pat. Nos. 4,654,867 or 4,696,027, supra.

In prior art cellular systems, if the radiotelephone unit to be handed-off does not receive the handoff information from the host site (block 240 of FIG. 2), the handoff is unsuccessful and the call is dropped. The conversation may be resumed in such systems only after reinitializing the call via a manual redial.

If a radiotelephone unit is not expected to be handed-off, flow proceeds to block 340 where a test is performed to determine if the target base site's signalling channel has received information requesting the initiation of a call by a radiotelephone. If no such request has been made, flow returns to block 310.

If such a request has been received by the base site equipment, flow proceeds from block 340 to block 350 where the base site equipment informs the switch controller of the request. The switch controller then analyzes the channel availability at the base site and assigns a channel for the requesting radiotelephone, blocks 360 and 370.

At block 380 the call is shown to have been successful.

The above flowcharts illustrate conventional handoff operation for conventional base site equipment which may be used in a cellular communication system which has been modified in accordance with the present invention. As will be discussed below, without any modifications to the base site equipment, the present invention provides a novel technique for overcoming the above discussed problem of not being able to complete a handoff due to the mobile not receiving the handoff information from the host base site equipment. The technique requires modifications only to the programming of a radiotelephone unit and to the programming the handoff algorithm in a switch controller. The modifications are respectively described in FIGS. 4 and 5.

Figure 4:
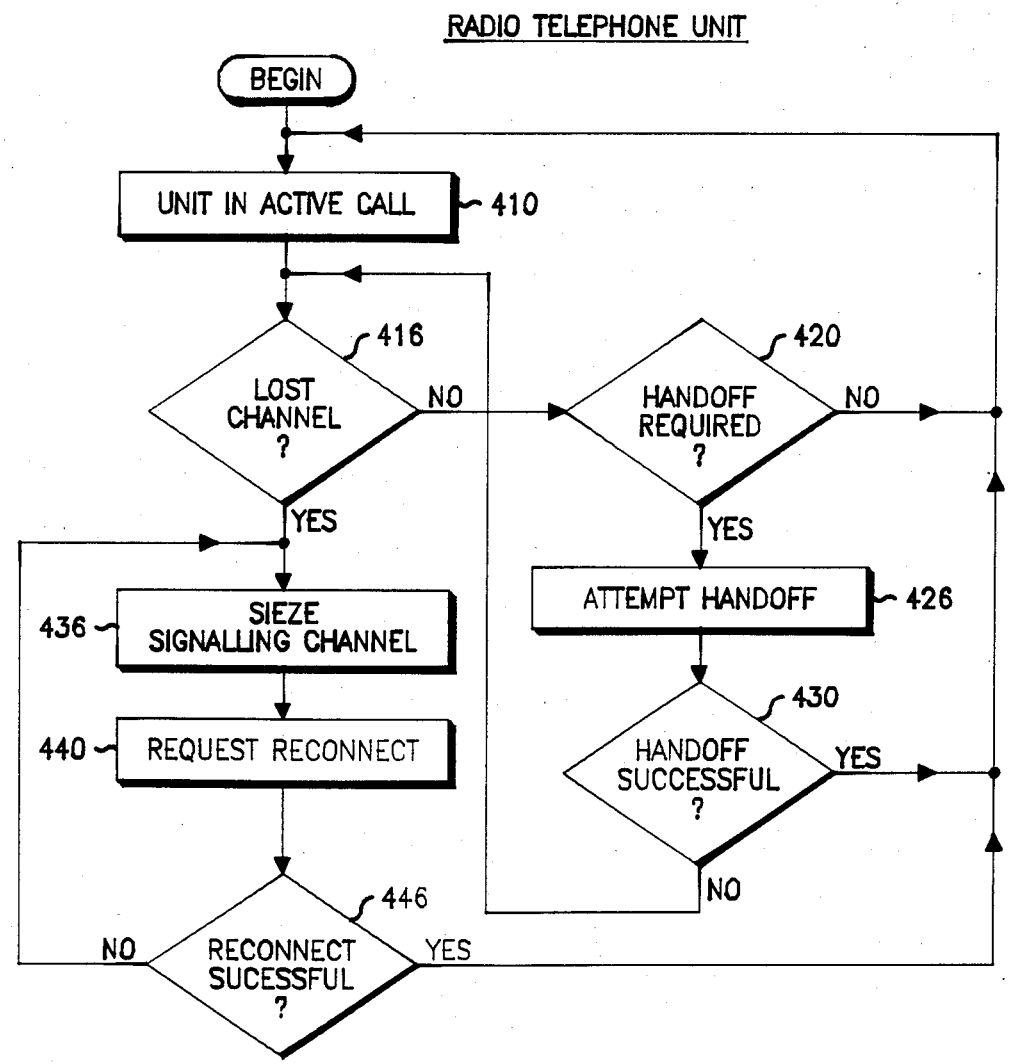
FIG. 4 is a flowchart illustrating a method of implementing the handoff operation of a radiotelephone unit, according to the present invention.

FIG. 4 illustrates a set of steps which may be used to implement the handoff operation, in accordance with the present invention, of the intelligence control unit of a cellular radiotelephone unit, such as the one described and illustrated in "DYNATAC Cellular Mobile Telephone Instruction Manual", supra. FIG. 4 begins at block 410 where the radiotelephone unit is presumed to be in an active call.

At block 416 a test is performed to determine if the channel on which the call is active has been lost. Such a determination can be made by employing the intelligence control unit of the radiotelephone by monitoring the signal strength of the received signal (e.g., by monitoring the output of the signal strength detector 156 of FIG. 1c) and/or by monitoring the received signal for the presence of SAT (e.g., by monitoring the output of the signal strength detector 156 of FIG. 1c). If the signal strength is below a predetermined threshold or if SAT has not been present for a predetermined period of time, the channel is presumed to be lost. If the channel is lost, flow proceds to block 436 where the radiotelephone attempts to sieze a signalling channel (to be discussed further below). If the channel is not lost, flow proceeds to block 420.

At block 420 a test is performed to determine if a handoff to a new site is required. For a system which controls handoffs strictly through the switch controller (122 of FIG. 1a), this determination entails monitoring the received signal for a handoff instruction from the host cell site (site 1 of FIG. 1a). For a system which additionally allows a handoff to be initiated by the radiotelephone (through manual keypad selection or automatically upon detection of a rapidly decreasing received RF signal level), this determination entails monitoring such manual or automatic initiation. If a handoff is not required, flow returns to block 410.

If a handoff is required, flow proceeds from block 420 to block 426 where the radiotelephone attempts to sieze the target handoff channel at the target site. Where the radiotelephone initiates the call, before such an attempt is made, the radio telephone must first request, via the host cell site, the target handoff information (minimally, the cell and channel). This should minimally include a request to the switch controller from the radiotelephone and an acknowledgement once the handoff information has been received.

From block 426 flow proceeds to block 430 where a test is performed to determine if the handoff attempt by the radiotelephone unit was successful. If the handoff attempt was successful, flow returns to block 410 where the radiotelephone unit continues its call at the targeted cell site (site 2). If the handoff attempt was not successful, flow proceeds from block 430 to block 416 where the lost channel test is performed.

If the channel has been lost, flow proceeds to block 436 where the radiotelephone unit attempts to sieze a signalling channel. Siezure of a signalling channel can occur either at the host cell site (site 1 of FIG. 1a) or at the target cell site (site 2 of FIG. 1a) if the radiotelephone is in better range of the target cell site.

Once a signalling channel has been siezed, flow proceeds to block 440 where a request is made to reconnect the call that was disconnected (momentarily lost). The reconnect request is performed automatically by the radiotelephone unit or through manual keypad selection by sending a modified call initiation (origination) message to the system. However, as part of the message which is sent from the radiotelephone unit to originate the call, a code is included to inform the switch controller (122 of FIG. 1a) that the call origination is actually a request for reconnection. Preferably, the code which is included as part of the originating message is transparent to the base station equipment. For example, the code can be implemented as a simple bit inversion in the originating message. Alternatively, the party number being called could be substituted by a special code which is recognizable by the switch controller. Either implementation allows the base site equipment receiving the call origination message to transparently communicate the message to the switch controller where the switch controller interprets the code embedded therein and reconnects the radiotelephone's call on a new channel.

From block 440, flow proceeds to block 446 where a test is performed to determine if the reconnect request was successful. The request is successful if the radiotelephone unit has arrived on the new channel (reconnected) by the base site equipment from which its signalling channel was siezed. If the radiotelephone has not arrived on the new channel, flow may return to block 436 where another attempt to sieze the signalling channel may be made, presuming the party at the other end of the call is still available. If the reconnect is successful, flow returns to block 410 where the radiotelephone unit continues its call via the reconnect.

Figure 5:
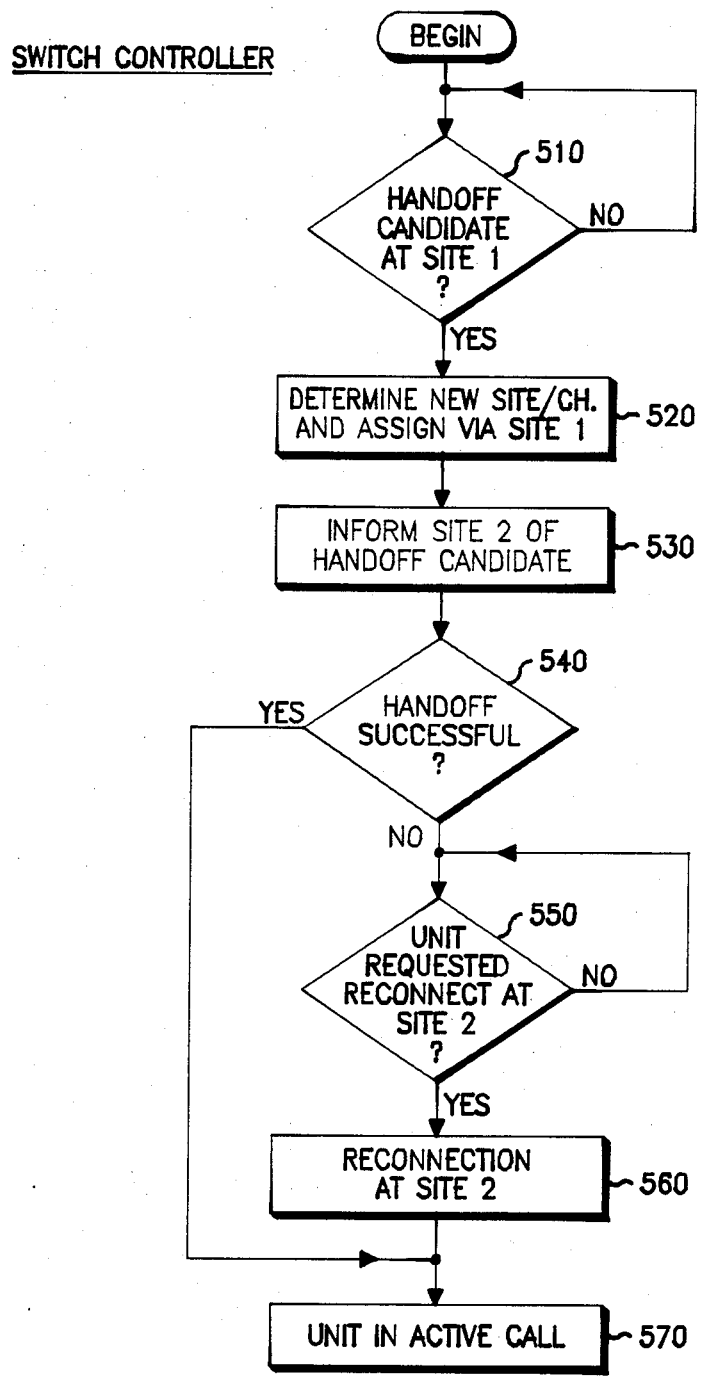
FIG. 5 is a flowchart illustrating a method of implementing the handoff operation of a cellular switch controller, according to the present invention.

FIG. 5 illustrates a set of steps which may be used to implement the handoff operation by the signal processing unit 121, in accordance with the present invention, of the cellular switch controller 122 of FIG. 1a. The flowchart of FIG. 5 begins at block 510 where the switch controller continually monitors the base site equipment at site 1 to determine if there is a handoff candidate at site 1.

Once a handoff candidate at site 1 is recognized, flow proceeds to block 520 where the switch controller determines the target site and channel to which the radiotelephone is to be handed-off (site 2 of FIG. 1).

At block 530, the switch controller communicates the handoff information to the base site equipment at site 2 to prepare the equipment at site 2 for the handoff.

At block 540, a test is performed to determine if the handoff was successful. If the handoff was successful, flow proceeds from block 540 to block 570 where the radiotelephone unit operates as normal after the handoff to the targeted site (site 2 of FIG. 2).

If the handoff was not successful, flow proceeds from block 540 to block 550 where the switch controller waits for a time for the radiotelephone unit to sieze the signalling channel from site 2 and request a reconnect (in the form of an initiated call by the radiotelephone unit as previously described) through the base site equipment at site 2.

Once the reconnect request is made, flow proceeds to block 560 where the switch controller interprets the request and reconnects the lost call using a channel at the target base site equipment (site 2). The reconnection is implemented as though a handoff from site 1 to site 2 is being performed. It should be noted that this reconnection would not have been necessary if the radiotelephone unit had previously received the handoff information from the host base site equipment (site 1).

At block 570, the radiotelephone unit continues its call via the reconnect at site 2.

Accordingly, the flowcharts illustrated in FIGS. 4 and 5 describe a manner in which the previously discussed dropped call problem can be overcome in a conventional cellular communication system by slightly modifying the operation of the switch controller and the radiotelephone unit. As FIGS. 2 and 3 illustrate, using the above implementation, no changes to the base site equipment are required.

Figure 6:
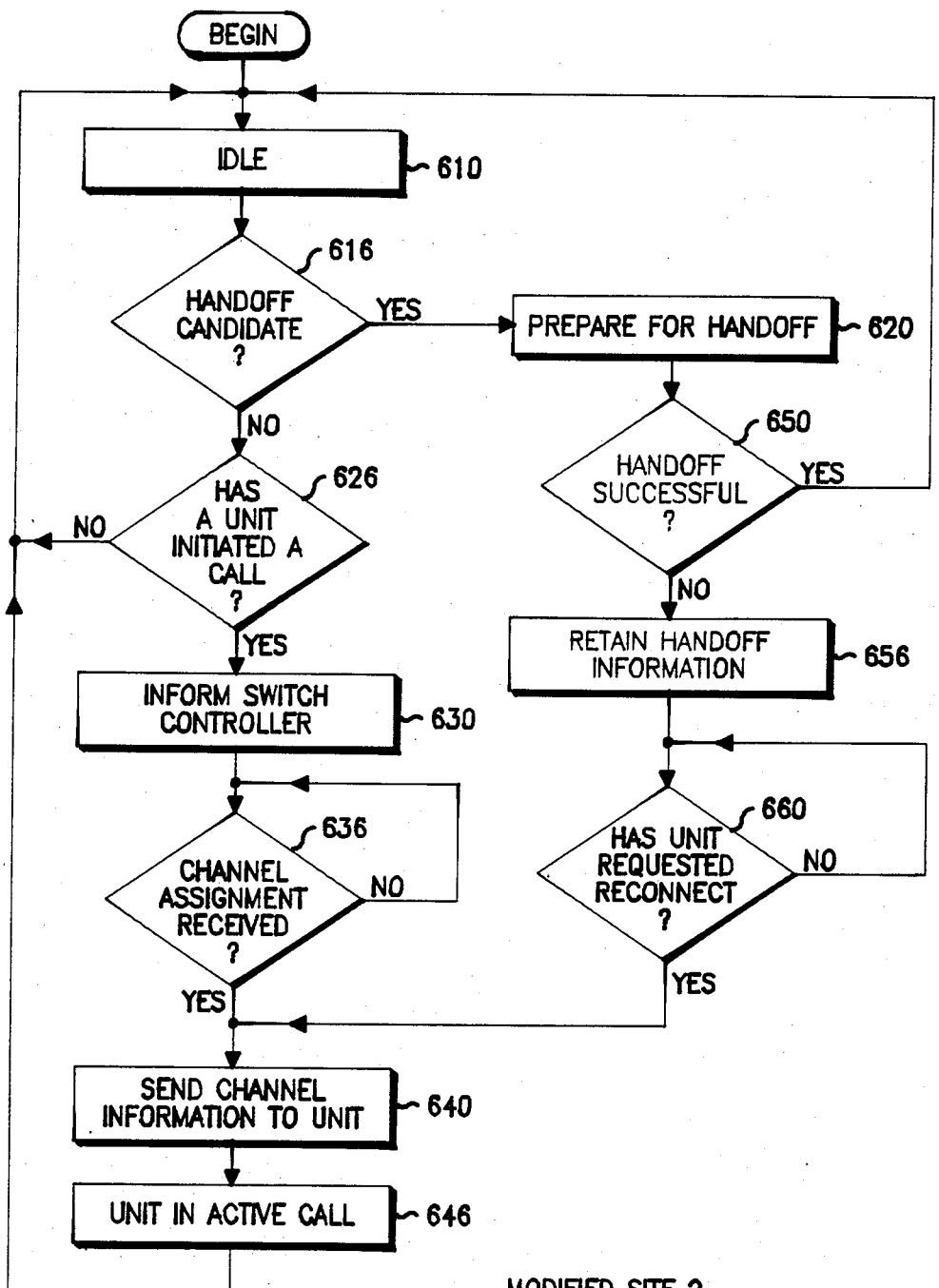
FIG. 6 is a flowchart illustrating a method of implementing the handoff operation in a base site controller, according to the present invention.

In FIG. 6, an alternative to the above implementation is provided. FIG. 6 illustrates a set of steps, in flowchart form, which may be used in accordance with the present invention by the intelligence control unit of the base site equipment at site 2 of FIG. 1a to implement the handoff operation. Using this implementation, the handoff operation by the base site equipment at site 1 and by the radiotelephone unit are the same as in the previous implementation. The flowchart of FIG. 5, for the switch controller, is not used. Rather, the operational steps of a conventional switch controller are used; i.e. only steps 510 through 530 of the flowchart of FIG. 5 ar performed by the switch controller.

The flowchart of FIG. 6 begins at block 610 where the base site is idle, i.e., no handoff is in progress. At block 616, a test is performed to determine if the switch controller has indicated that a handoff is expected. If a handoff is expected, flow proceeds to block 620 where the base site equipment prepares for the handoff.

If a handoff is not about to take place, flow proceeds from block 616 to block 626 where a test is performed to determined if a radiotelephone unit has initiated a call at site 2. If a unit has not initiated a call, flow returns to block 610.

If a radiotelephone unit has initiated a call, flow proceeds from block 626 to block 630 where the base site equipment informs the switch controller of the unit's request to place a call.

At block 636, the base site equipment waits (for a time) for the channel assignment information for call initiation or call handoff from the switch controller.

Once the channel assignment information is received at the base site equipment, flow proceeds to block 640 where the channel assignment information is transmitted to the radiotelephone unit requesting the call initiation.

At block 646, the radiotelephone unit is presumed to be in an active call, and flow returns to block 610.

The flow of steps depicted from block 616 through block 646 illustrates the conventional manner in which conventional base site equipment operates when a call request is made by radiotelephone unit.

From block 616, if the base site equipment is informed that a handoff is about to take place, flow proceeds to block 620 where, as previously indicated, the base site equipment prepares for the handoff.

At block 650, a test is performed to determine if the handoff was successful. If the handoff was successful, the switch is informed and flow returns to block 6'10

If the handoff was unsuccessful, flow proceeds from block 650 to block 656 where the base site equipment stores the handoff information received from the switch controller in memory.

At block 660, the base site equipment presumes that the radiotelephone unit did not receive the handoff instruction from the base site equipment at site 1, and waits for a time for the radiotelephone unit to request a reconnect at the targeted site (site 2).

Once the radiotelephone unit requests the reconnect at the targeted site (site 2), flow proceeds to block 640 where the handoff information stored in memory (block 656) is transmitted from the base site equipment to the radiotelephone unit to complete the handoff.

The successful handoff is depicted at block 646.

As previously discussed, siezure of a signalling channel can occur either at the host cell site (site 1 of FIG. 1a) or at the target cell site (site 2 of FIG. 1a). For this reason, if the radiotelephone loses its call while still within the host base site coverage area, the reconnection operation discussed herein can be used. The siezure of the control channel occurs at site one rather than at site 2.

The present invention therefore provides two novel implementations for overcoming the problem of dropping a call in a cellular communication system which is caused by the radiotelephone unit not receiving the handoff information from the base site equipment at the host cell site.

It will be understood by those skilled in the art that various modifications and changes may be made to the present invention without departing from the spirit and scope thereof. For example, a combination of modifications may be made to each of blocks illustrated in FIG. 1a for implementing the present invention.

What is claimed is:

1. A cellular radiotelephone communication system having at least first base site equipment and second base site equipment with associated radiotelephone communication coverage areas and a switch controller for connecting radiotelephone communication with the base site equipment, wherein at least one radiotelephone is initially in an active call within the coverage area of the first base site equipment, comprising:

(a) means for determining that the radiotelephone requires a handoff from the first base site equipment's coverage area;

(b) first radiotelephone means for determining that the active call has been lost;

(c) second radiotelephone means, responsive to the determination that the active call has been lost, for indicating to the second base site equipment that the radiotelephone requests a reconnection of the lost call; and (d) second base site equipment means, responsive to data exchanged with the switch controller, for communicating with the radiotelephone in order to continue the radiotelephone's active call as the radiotelephone transits into the second base site equipment's coverage area.

2. A cellular radiotelephone communication system, according to claim 1, wherein the determination means is coupled with the first base site equipment.

3. A cellular radiotelephone communication system, according to claim 1, wherein the determination means is coupled with the radiotelephone means.

4. A cellular radiotelephone communication system, according to claim 1, wherein the second radiotelephone means includes means for siezing a control channel provided by the second base site equipment.

5. A cellular radiotelephone communication system, according to claim 1, wherein at least part of the data exchanged with the switch controller is received and stored by the second base site equipment in response to the determination that the handoff is required.

6. A cellular radiotelephone communication system, according to claim 1, wherein the data exchanged with the switch controller occurs before the reconnection request.

7. A cellular radiotelephone communication system, according to claim 1,.wherein the data exchanged with the switch controller after the reconnection request.

8. A cellular radiotelephone communication system, according to claim 7, wherein the data exchanged with the switch controller occurs after and before the reconnection request.

9. A radiotelephone for use in a cellular radiotelephone communication system having at least first base site equipment and second base site equipment with associated coverage areas and a switch controller for connecting radiotelephone communication with the base site equipment, wherein radiotelephones are capable of communicating while in transition between the aforesaid coverage areas and wherein the radiotelephone is initially in an active call on a channel within the coverage area of the first base site equipment, comprising:

(a) first means for determining that the active call has been lost;

(b) second means, responsive to said first means determining that the active call has been lost, for indicating to the system that the radiotelephone is requesting a reconnection of the lost call;

(c) third means, responsive to the second means requesting a reconnection of the lost call, for receiving a channel assignment from the second base site equipment; and (d) fourth means, responsive to the third means receiving the channel assignment, for reestablishing the active call on the channel assigned by the second base site equipment within the coverage area of the second base site equipment.

10. A radiotelephone according to claim 9, further including fifth means for determining that the radiotelephone requires a handoff to the second base site equipment's coverage area, wherein the first means is responsive to said fifth means.

11. A radiotelephone according to claim 9, wherein the second means includes means for siezing a control channel provided by the second base site equipment.

12. A radiotelephone according to claim 9, wherein the first means includes means for detecting the absense of a supervisory audio tone provided by the first base site equipment.

13. A radiotelephone according to claim 12, wherein the first means further includes means for detecting the signal strength of a signal transmitted by the first base site equipment.

14. A radiotelephone according to claim 9, wherein the first means includes means for detecting the signal strength of a signal transmitted by the first base site equipment.

15. A switch controller for connecting radiotelephones with communication equipment in a cellular radiotelephone communication system having at least first base site equipment and second base site equipment with associated communication coverage areas, wherein a radiotelephone is initially in an active call on a channel within the coverage area of the first base site equipment, comprising:

(a) first means, responsive to a message generated by the radiotelephone received via the second base site equipment, for determining that the radiotelephone has requested that the active call be reconnected;

(b) second means for effecting a channel assignment for the radiotelephone at the second base site equipment; and (c) third means for reestablishing the communication that was initialized in the first base site equipment's coverage area on the channel assigned at the second base site equipment's coverage area in order to reconnect the radiotelephone's call as the radiotelephone transits into the second base site equipment's coverage area.

16. A base site controller for use in a cellular radiotelephone communication system having at least first base site equipment and second base site equipment with associated coverage areas and a switch controller for connecting radiotelephone communication with the base site equipment, wherein a radiotelephone is initially in an active call and the switch controller has determined that a handoff of the call is required from the coverage area of the first base site equipment to the coverage area of the second base site equipment, comprising:

(a) first means, responsive to the switch controller, for receiving and storing a handoff message for the radiotelephone;

(b) second means for receiving and interpretting a transmission from the radio telephone that indicates a reconnect request at the second base site equipment's coverage area; and (c) third means for reconnecting the call at the second base site equipment's coverage area by transmitting a channel assignment derived from the stored handoff message to the radiotelephone in order to reconnect the radiotelephone's call in the second base site equipment's coverage area.

17. A cellular radiotelephone communication system having at least first base site equipment and second base site equipment with associated radiotelephone communication coverage areas and a switch controller for connecting radiotelephone communication with the base site equipment, wherein at least one radiotelephone is in an active call on a channel within the coverage area of the first base site equipment and in transition to the coverage area of the second base site equipment, comprising:
  (a) first means for determining that the radiotelephone requires a handoff from the first base site equipment's coverage area;
  (b) switch controller means for communicating a handoff message to the first base site equipment for the radiotelephone;
  (c) first base site equipment means, responsive to the switch controller means handoff message, for communicating a corresponding handoff message to the radiotelephone;
  (d) first radiotelephone means for determining that the active call has been lost;
  (e) second radiotelephone means, responsive to the determination that the active call has been lost, for siezing a control channel and indicating to the base site equipment providing the control channel that the radiotelephone requests a reconnection; and
  (f) base site equipment means, responsive to data exchanged with the switch controller, for communicating with the radiotelephone in order to continue the radiotelephone's active call.

18. For use by a cellular radiotelephone communication system having at least first base site equipment and second base site equipment with associated radiotelephone communication coverage areas and a switch controller for connecting radiotelephone communication with the base site equipment, wherein at least one radiotelephone is initially in an active call within the coverage area of the first base site equipment, a method of recovering a lost call, comprising the steps of:
  (a) determining that the radiotelephone requires a handoff from the first base site equipment's coverage area;
  (b) determining that the active call has been lost at the radiotelephone;
  (c) responsive to the determination that the active call has been lost, indicating from the radiotelephone to the second base site equipment that the radiotelephone requests a reconnection of the lost call; and
  (d) responsive to data received from the switch controller, communicating between second base site equipment and the radiotelephone in order to continue the radiotelephone's active call as the radiotelephone transits into the second base site equipment's coverage area.

19. A method of reconnecting the active call in a cellular radiotelephone communication system, according to claim 18, wherein the step of determining is executed by the first base site equipment.

20. A method of reconnecting the active call in a cellular radiotelephone communication system, according to claim 18, wherein the step of determining is executed by the radiotelephone.

21. A method of reconnecting the active call in a cellular radiotelephone communication system, according to claim 18, wherein the step of indicating includes the step of siezing a control channel provided by the second base site equipment.

22. A method of reconnecting the active call in a cellular radiotelephone communication system, according to claim 18, wherein the data received from the switch controller occurs before the radiotelephone requests the reconnect.

23. A method of reconnecting the active call in a cellular radiotelephone communication system, according to claim 18, wherein the data received from the switch controller occurs after the radiotelephone requests the reconnect.

24. For use in a cellular radiotelephone communication system having at least first base site equipment and second base site equipment with associated coverage areas and a switch controller for connecting radiotelephone communication with the base site equipment, wherein radiotelephones are capable of communicating while in transition between the aforesaid coverage areas and wherein the radiotelephone is initially in an active call on a channel within the coverage area of the first base site equipment, a method of recovering a lost call by a radiotelephone, comprising the steps of:
  (a) determining that the act has been lost;
  (b) responsive to the step of determining that the active call has been lost, indicating to the system that the radiotelephone is requesting a reconnection of the lost call;
  (c) responsive to the step of requesting a reconnection of the lost call, receiving a channel assignment from the second base site equipment; and
  (d) responsive to the step of receiving the channel assignment, reestablishing the active call on the channel assigned by the second base site equipment within the coverage area of the second base site equipment.

25. A method of recovering a lost call by a radiotelephone, according to claim 24, wherein the step of determining that the active call has been lost is responsive to a step of determining that the radiotelephone requires a handoff from the first base site equipment's coverage area.

26. A method of recovering a lost call by a radiotelephone, according to claim 24, wherein the step of indicating is preceded by the step of siezing a control channel provided by the second base site equipment.

27. A method of recovering a lost call by a radiotelephone, according to claim 24, wherein the step of determining that the active call has been lost includes the step of detecting the absense of a supervisory audio tone provided by the first base site equipment.

28. A method of recovering a lost call by a radiotelephone, according to claim 27, wherein the step of determining that the active call has been lost includes the step of detecting the signal strength of a signal transmitted by the first base site equipment.

29. A method of recovering a lost call by a radiotelephone, according to claim 24, wherein the step of determining that the active call has been lost includes the step of detecting the signal strength of a signal transmitted by the first base site equipment.

30. For use by a switch controller which connects radiotelephones with communication equipment in a cellular radiotelephone communication system having at least first base site equipment and second base site equipment with associated communication coverage areas, wherein a radiotelephone is initially in an active call on a channel within the coverage area of the first base site equipment, a method of recovering a lost call, comprising:
  (a) responsive to a message generated by the radiotelephone received via the second base site equipment, determining that the radiotelephone has requested that the active call be reconnected;
  (b) effecting a channel assignment for the radiotelephone at the second base site equipment; and
  (c) reestablishing the communication that was initialized in the first base site equipment's coverage area on the channel assigned at the second base site equipment's coverage area in order to reconnect the radiotelephone's call as the radiotelephone transits into the second base site equipment's coverage area.

31. For use by a base site controller within a cellular radiotelephone communication system having at least first base site equipment and second base site equipment with associated coverage areas and a switch controller for connecting radiotelephone communication with the base site equipment, wherein a radiotelephone is initially in an active call and the switch controller has determined that a handoff of the call is required from the coverage area of the first base site equipment to the coverage area of the second base site equipment, a method of recovering a lost call, comprising:
  (a) responsive to the switch controller, receiving and storing a handoff message for the radiotelephone;
  (b) receiving and interpretting a transmission from the radio telephone that indicates a reconnect request at the second base site equipment's coverage area; and
  (c) reconnecting the call at the second base site equipment's coverage area by transmitting information derived from the stored handoff message to the radiotelephone in order to reconnect the radiotelephone's call in the second base site equipment's coverage area.

32. For use by a cellular radiotelephone communication system having at least first base site equipment and second base site equipment with associated radiotelephone communication coverage areas and a switch controller for connecting radiotelephone communication with the base site equipment, wherein at least one radiotelephone is in an active call on a channel within the coverage area of the first base site equipment and in transition to the coverage area of the second base site equipment, a method of recovering a lost call, comprising the steps of:
  (a) determining that the radiotelephone requires a handoff from the first base site equipment's coverage area;
  (b) communicating a handoff message to the first base site equipment for the radiotelephone;
  (c) responsive to the switch controller means handoff message, communicating a corresponding handoff message from the first base site equipment to the radiotelephone;
  (d) determining that the active call has been lost within the radiotelephone means;
  (e) responsive to the determination that the active call has been lost, siezing a control channel and indicating to the base site equipment providing the control channel that the radiotelephone requests a reconnection; and
  (f) communicating between the base site equipment providing the control channel and the radiotelephone in order to continue the radiotelephone's active call.

* * * * *

UNITED STATES PATENT AND TRADEMARK OFFICE
CERTIFICATE OF CORRECTION

PATENT NO. : 4,811,380

DATED : Mar. 7, 1989

INVENTOR(S) : Spear

It is certified that error appears in the above-identified patent and that said Letters Patent is hereby corrected as shown below:

In the Abstract, line 13, "siezes" should be --seizes--.

In the Abstract, line 14, "site a call" should be --site, a call--.

In Col. 3, line 10, "115 an 119" should be --115 and 119--.

In Col. 3, line 49, "superviory" should be --supervisory--.

In Col. 4, line 9, "Little" should be --Cooper--.

In Col. 5, line 62, "proceds" should be --proceeds--.

In Col. 5, line 63, "sieze" should be --seize--.

In Col. 6, line 11, "sieze" should be --seize--.

In Col. 6, line 29, "sieze" should be --seize--.

In Col. 6, line 30, "Siezure" should be --Seizure--.

In Col. 6, line 34, "siezed" should be --seized--.

In Col. 6, line 62, "siezed" should be --seized--.

In Col. 6, line 64, "sieze" should be --seize--.

In Col. 7, line 23, "sieze" should be --seize--.

In Col. 7, line 58, "ar" should be --are--.

In Col. 7, line 68, "determined" should be --determine--.

In Col. 8, line 20, "by radiotelephone unit" should be --by the radiotelephone unit--.

In Col. 8, line 27, "6'10" should be --610.--.

In Col. 8, line 43, "siezure" should be --seizure--.

In Col. 8, line 48, "siezure" should be --seizure--.

In Col. 9, line 28, "siezing" should be --seizing--.

In Col. 10, line 10, "siezing" should be --seizing--.

UNITED STATES PATENT AND TRADEMARK OFFICE
CERTIFICATE OF CORRECTION

PATENT NO. : 4,811,380

DATED : Mar. 7, 1989

INVENTOR(S) : Spear

It is certified that error appears in the above-identified patent and that said Letters Patent is hereby corrected as shown below:

In Col. 10, line 13, "absense" should be --absence--.

In Col. 10, line 61, "interpretting" should be --interpreting--.

In Col. 11, line 27, "siezing" should be --seizing--.

In Col. 12, line 1, "siezing" should be --seizing--.

In Col. 12, line 45, "siezing" should be --seizing--.

In Col. 12, line 50, "absense" should be --absence--.

In Col. 13, line 29, "interpretting" should be --interpreting--.

In Col. 14, line 27, "siezing" should be --seizing--.

Signed and Sealed this

Twenty-second Day of January, 1991

Attest:

HARRY F. MANBECK, JR.

*Attesting Officer*   *Commissioner of Patents and Trademarks*